United States Patent
Dunemann

[11] Patent Number: 5,812,007
[45] Date of Patent: Sep. 22, 1998

[54] SYSTEM FOR TRANSMITTING BINARY SIGNALS OVER A SIGNAL LINE

[75] Inventor: Klaus Dunemann, Karlsbad, Germany

[73] Assignee: Siemens Aktiengesellschaft, Munich, Germany

[21] Appl. No.: 411,610

[22] PCT Filed: Sep. 28, 1993

[86] PCT No.: PCT/DE93/00926

§ 371 Date: Apr. 7, 1995

§ 102(e) Date: Apr. 7, 1995

[87] PCT Pub. No.: WO94/08416

PCT Pub. Date: Apr. 14, 1994

[30] Foreign Application Priority Data

Oct. 7, 1992 [DE] Germany .......................... 42 34 402.6

[51] Int. Cl.⁶ .................................................. H03K 5/08
[52] U.S. Cl. .......................... 327/313; 327/316; 327/327; 326/30
[58] Field of Search .................................. 327/143, 198, 327/306, 309, 310, 312, 313, 316, 327; 326/30; 361/92, 93, 101

[56] References Cited

U.S. PATENT DOCUMENTS

| | | | |
|---|---|---|---|
| 4,210,829 | 7/1980 | Wong et al. | 327/143 |
| 4,307,306 | 12/1981 | Kucharewski | 327/198 |
| 4,591,742 | 5/1986 | Morito | 326/30 |
| 4,698,655 | 10/1987 | Schultz | 361/103 |
| 4,748,352 | 5/1988 | Kamiya et al. | 327/143 |
| 5,166,561 | 11/1992 | Okura | 327/312 |
| 5,329,174 | 7/1994 | Chiang | 327/313 |
| 5,347,170 | 9/1994 | Hayakawa et al. | 327/546 |
| 5,570,259 | 10/1996 | Almeier et al. | 361/86 |

FOREIGN PATENT DOCUMENTS

| | | |
|---|---|---|
| 1 237 173 | 3/1967 | Germany . |
| 1 287 604 | 1/1969 | Germany . |
| 32 28 013 C2 | 3/1983 | Germany . |
| 37 38 800 A1 | 5/1989 | Germany . |
| 58-6623 | 1/1983 | Japan ................................ 327/143 |
| 6-196988 | 7/1994 | Japan ................................ 327/143 |

*Primary Examiner*—Terry Cunningham
*Attorney, Agent, or Firm*—Kenyon & Kenyon

[57] ABSTRACT

The invention relates to a system for transmitting binary signals over a signal line to a signal detecting device, in which a DC source is temporarily connectable to the signal line for generating binary signals. A discharge circuit is connected to the signal line. In order to keep the power loss very low in such a system, discharge circuit (7) contains a switchable current sink (8) connected to a signal line (3). Discharge circuit (7) also has a threshold value determination device (19) connected to signal line (3) in parallel with switchable current sink (8). Output (26) of threshold value determination device (19) is connected with a control input (17) of switchable current sink (8).

7 Claims, 1 Drawing Sheet

SYSTEM FOR TRANSMITTING BINARY SIGNALS OVER A SIGNAL LINE

BACKGROUND OF THE INVENTION

When binary signals, generated by temporarily connecting a DC source at relatively high voltage to a signal line, are used to transmit information over the signal line, the residual charge on the signal line must be reduced as quickly as possible after the signal level changes to achieve a high baud rate for transmission and to detect quickly a signal change. In addition, partial discharges on the signal line must be dissipated quickly. These requirements are especially important for applications in which signals are conducted over a long, capacitance-affected signal line. In such applications, a high discharge current must be assured for the charge stored on the signal line.

For example, if a 220 VDC source is used and the length of the signal line is 1 km, corresponding to a line capacitance of 200 nF, a discharge current of 15 mA must flow if the voltage on the signal line is to be reduced sufficiently within 1 ms after each disconnection of the DC source (from 220 V to 150 V for example). The discharge current must be correspondingly high if a parasitic noise voltage is to be dissipated quickly.

To solve this problem, in a system for transmitting binary signals over a signal line (see e.g., command and alarm module of the previously publicly used Siemens SINAUT-LSA telecontrol unit), a discharge circuit with a resistor and a downstream diode circuit was connected to the signal line. A high discharge current can flow continuously through such a discharge circuit even when the DC source is temporarily connected to the signal line. This results in a power loss of several watts. This power loss can cause problems with heat generation, particularly when several signal lines lead to one unit in which a corresponding number of discharge circuits must be available.

German Patent No. 12 87 604 discusses a system for transmitting binary signals over a signal line to a signal detector, in which a DC source is temporarily connectable to the signal line as binary signals are generated, and in which a discharge circuit is connected to the signal line. In the arrangement of the '604 German patent, to compensate for parasitic line capacitances from the discharge circuit, the charge on the line is reversed between the binary signals formed by positive pulses, with a transistor that is connected so that it usually conducts, being blocked at the beginning of each positive pulse, and conducting again at the end of each pulse. In this way, another transistor is switched to conduct briefly, through which a negative voltage is applied to the line temporarily, resulting in a rapid polarity reversal of the line.

SUMMARY OF THE INVENTION

The goal of the present invention is to reduce considerably the power loss caused by the discharge circuit and to eliminate noise coupled into the signal line during any pauses between the binary signals. The present invention departs from a system for transmitting binary signals over a signal line to a signal detector in which a DC source is temporarily connectable to the signal line as binary signals are generated and a discharge circuit is connected to the signal line.

To achieve the above mentioned goal, in a system of this kind according to the present invention, the discharge circuit contains a switchable current sink connected to the signal line. The discharge circuit has a threshold value determination device connected to the signal line, in parallel with the switchable current sink. The output of the current threshold value determination device is connected with a control input of the switchable current sink such that a current-determining resistance of the switchable current sink is changeable under control by the threshold value determination device.

A threshold value determination device is discussed in German Patent No. 1 237 173. However that device forms a component of a circuit for steepening the slopes of pulses, especially in radar and television technology.

An important advantage of the system according to the present invention is that only a low discharge current flows through the discharge circuit during a binary "high" signal. The discharge current increases only when the voltage on the signal line drops after the binary signal ends. Therefore, the increased discharge current flows only during the discharge time of the signal line, during the pauses between the binary signals or after noise is introduced in the signal line. The system according to the present invention has a power loss of only about 5% of that of the aforementioned known system, while maintaining the dynamic properties of the known system.

In the system according to the present invention, the current-determining resistance of the switchable current sink is advantageously variable under the control of the threshold value determination device.

In the system according to the present invention, the threshold value determination device can take different forms. However, providing the threshold value determination device with a diode arrangement in series with a storage capacitor and forming the output of the threshold value determination device from a connection between the storage capacitor and the diode arrangement is especially advantageous. The diode arrangement thereby determines, with its diode thresholds, the activation threshold for the switchable current sink.

In the system according to the present invention, the switchable current sink is advantageously provided with a current amplifier on its control input side. This arrangement permits the capacitances of the signal line, equal to the current amplification factor multiplied by the capacitance of the storage capacitor, to be rapidly discharged. An emitter follower can be used as the current amplifier, for example.

In addition, providing the control input of the switchable current sink with a delay circuit, connected ahead of it, is advantageous because the delay circuit allows the response of the switchable current sink to be delayed.

In the system according to the present invention, the switchable current sink is advantageously connected through an ohmic resistance to the signal line. As a result, a control voltage with hysteresis can be obtained that can be used for example to control a level evaluation circuit in the signal detector.

Connecting switchable current sink with the signal line through a PTC thermistor is advantageous because a thermal overload on the discharge circuit, due for example to an excessive operating frequency, can thereby be avoided.

DETAILED DESCRIPTION

Figure 1:
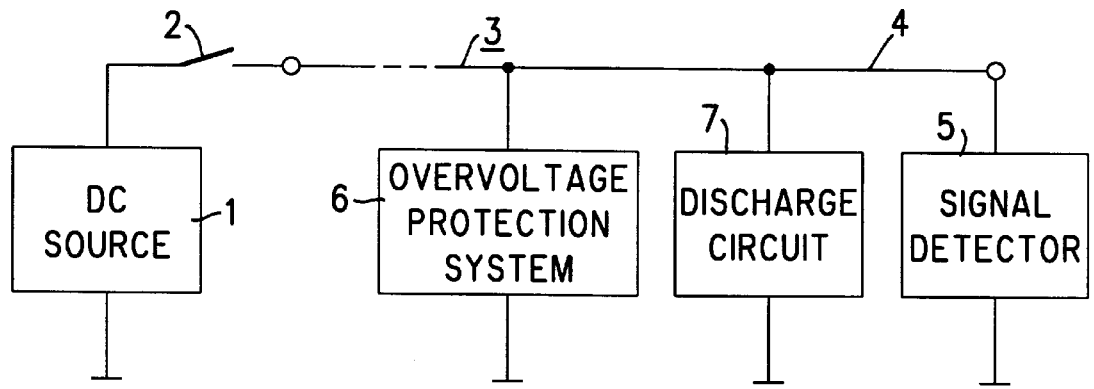
FIG. 1 is a block diagram of a system for transmitting binary signals through a signal line with a discharge circuit.

The system shown in FIG. 1 comprises a DC source 1 that can deliver a DC voltage of between 24 and 250 V for example. The DC source 1 is temporarily connectable, by means of an alarm contact 2, which can also be an electronic signal switch, to a signal line 3, thereby generating binary signals. The signal line 3 can be a capacitance-affected line with 220 nF/km, for example. A signal detector 5 is arranged at an end 4 of the signal line 3. The signal detector 5 is associated with an overvoltage protection system 6 and a discharge circuit 7. Both the overvoltage protection system 6 and the discharge circuit 7 are likewise connected to the end 4 of signal line 3.

Figure 2:
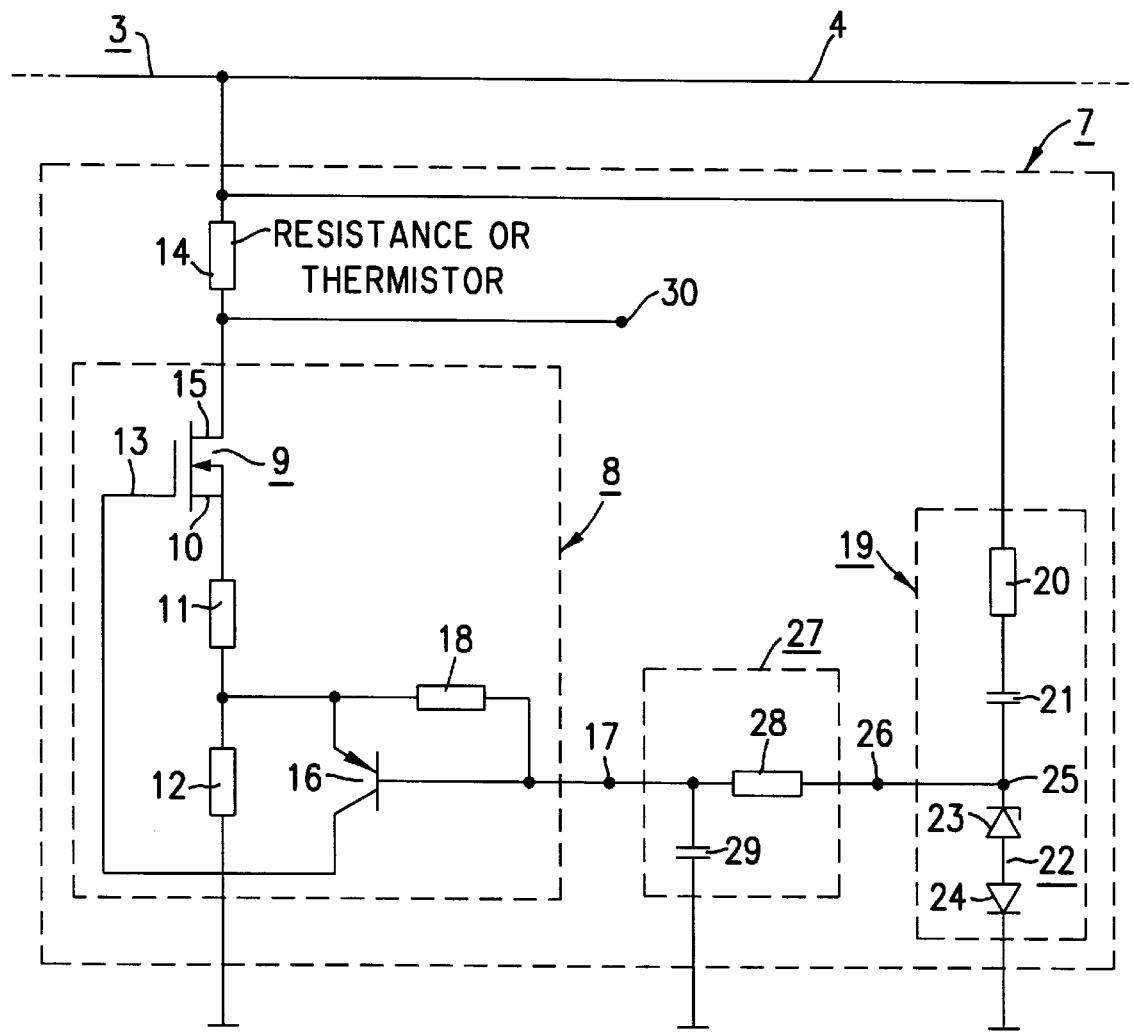
FIG. 2 is a schematic illustrating an embodiment of an advantageous discharge circuit of the present invention.

In a preferred embodiment of the present invention, the discharge circuit 7 is designed as shown in FIG. 2. The discharge circuit 7 of FIG. 2 includes a current sink 8 having a depletion-type n-channel field effect transistor 9. A series circuit, composed of a first resistor 11 with resistance $R_1$ and a second resistor 12 with resistance $R_2$, is connected between ground and the source electrode 10 of the transistor 9. The resistance $R_1$ is much less than the resistance $R_2$. The gate electrode 13 of the field effect transistor 9 is connected to ground. The drain electrode 15 of the depletion-type field effect transistor 9 is connected to the end 4 of the signal line 3 via an ohmic resistance or a PTC thermistor 14.

The emitter-collector lead of a p-n-p transistor 16 is connected in parallel with the second resistor 12. The base of the transistor 16 is connected to a control input 17 of the switchable current sink 8. A high-ohmage resistor 18, which blocks the transistor 16 when the voltage on signal line 3 increases or remains constant, is located between the emitter and the base of transistor 16. When the transistor 16 is caused to conduct by a corresponding signal at the control input 17 of the switchable current sink 8, the second resistor 12 is shunted, thereby considerably reducing the current-determining resistance of switchable current sink 8 formed by resistors 11 and 12 since $R_1$, is much less than $R_2$. Accordingly, in such an instance, a high discharge current flows through the current sink 8.

A threshold value determination device 19 is connected, in parallel with the switchable current sink 8, to the end 4 of the signal line 3. The threshold value determination device includes a series circuit composed of a resistor 20 and a storage capacitor 21, and a diode arrangement 22 having a Zener diode 23 and a flux diode 24. The resistor 20 serves as a protective resistor while the storage capacitor 21 is charging, when the voltage from the DC source 1 is applied to the signal line 3. The diode arrangement 22 is dimensioned so that the zener diode voltage and flux diode voltage roughly correspond to the gate-source voltage of field effect transistor 9. The Zener diode 23 can be replaced with a reverse-connected flux diode.

An output line 26 is connected to the threshold value determination device 19 at a node 25 between the diode arrangement 22 and storage capacitor 21. A delay circuit 27, containing a resistor 28 and a capacitor 29, is connected between the output 26 of the threshold value determination device 19 and the control input 17 of switchable current sink 8. By suitably dimensioning elements 28 and 29 of delay circuit 27, a response delay of switchable current 8 can be adjusted.

The system and the discharge circuit of the present invention operate as follows. If the DC voltage on the signal line 3 or at its end 4 decreases after the alarm contact 2 opens, the transistor 16 of the switchable current sink 8 is triggered by a threshold value on the transistor 16 of the switchable current sink 8, set by the diode arrangement 22. Consequently, the discharge current through switchable current sink 8, which has been very small up to this point, is considerably increased because the second resistor 12 is shunted. Consequently, the voltage drop on signal line 3 is accelerated. In these instances, the transistor 16 is activated up to its saturation voltage, so that the discharge current is determined only by the value $R_1$, of resistor 11. Accordingly, a very high discharge current, 20 mA for example, flows through the current sink 8 to ground. When alarm contact 2 closes again, the voltage at output 26 of threshold value determination device 19 rises once again and transistor 16 is blocked (i.e., is opened or does not conduct). Now the second resistor 12 is no long shunted. Consequently, the discharge current is very low because of the increased resistance.

Finally, a signal can be tapped from an output 30 and hence at the connection of resistor 14 to switchable current sink 8, said signal exhibiting hysteresis. A level evaluation, not shown here, in signal detector 5 can be controlled by this signal.

The present invention relates to a system for transmitting binary signals over a signal line to a signal detecting device, in which a DC source is temporarily connectable to the signal line for generating binary signals. A discharge circuit is connected to the signal line. To keep the power loss very low in such a system, a discharge circuit contains a switchable current sink connected to the signal line. The discharge circuit also has a threshold value determination device connected to the signal line in parallel with the switchable current sink. An output of the threshold value determination device is coupled with a control input of switchable current sink.

I claim:

1. An arrangement for use with a system for transmitting binary signals over a signal line to a signal detector, the binary signals being generated by a DC source that is temporarily connectable to the signal line, the arrangement comprising:

a) a discharge circuit, the discharge circuit including
      i. a switchable current sink coupled between the signal line and ground, and having a control input and a current-determining resistance; and
      ii. a threshold value determination device coupled between the signal line and ground, in parallel with the switchable current sink, and having an output coupled with the control input of the switchable current sink such that the current-determining resistance can be changed by the threshold value determination device,
   wherein the threshold value determination device includes a diode circuit coupled in series with a storage capacitor, and wherein the output of the threshold value determination device is defined at anode between the diode circuit and the storage capacitor.

2. The arrangement of claim 1 wherein the switchable current sink includes a current amplification device.

3. The arrangement of claim 1 further comprising a delay circuit arranged between the output of the threshold value determination device and the control input of the switchable current sink.

4. The arrangement of claim 1 further comprising an ohmic resistance arranged between the signal line and the switchable current sink.

5. An arrangement for use with a system for transmitting binary signals over a signal line to a signal detector, the binary signals being generated by a DC source that is temporarily connectable to the signal line, the arrangement comprising:

a) a discharge circuit, the discharge circuit including i. a switchable current sink coupled between the signal line and ground and having a control input and a current-determining resistance, the current-determining resistance including a series connection of a first resistor and a second resistor, the second resistor having a much higher resistance than that of the first resistor, and ii. a threshold value determination device coupled between the signal line and ground, in parallel with the switchable current sink, and having an output coupled with the control input of the switchable current sink such that the current-determining resistance can be changed by the threshold value determination device; and b) a PTC thermistor arranged between the signal line and the switchable current sink.

6. An arrangement for use with a system for transmitting binary signals over a signal line to a signal detector, the binary signals being generated by a DC source that is temporarily connectable to the signal line, the arrangement comprising:

a) a discharge circuit, the discharge circuit including i. a switchable current sink coupled between the signal line and ground and having a control input and a current-determining resistance, the current-determining resistance including a series connection of a first resistor and a second resistor, the second resistor having a much higher resistance than that of the first resistor; and ii. a threshold value determination device coupled between the signal line and ground, in parallel with the switchable current sink, and having an output coupled with the control input of the switchable current sink such that the current-determining resistance can be changed by the threshold value determination device, wherein the switchable current sink includes a transistor including a base, a collector, and an emitter, the base being coupled with the control input of the switchable current sink, the collector being coupled with ground, and the emitter being coupled at a node between the first resistor and the second resistor.

7. The arrangement of claim 6 wherein the current-determining resistance further includes a high ohm resistance coupled between the emitter and the base of the transistor.

* * * * *